(12) United States Patent
Laredo et al.

(10) Patent No.: US 8,594,306 B2
(45) Date of Patent: Nov. 26, 2013

(54) PROVIDING INFORMATION BY A CONTACT CENTER

(75) Inventors: Jim Alain Laredo, Katonah, NY (US); Gopal Sarma Pingali, Mohegan Lake, NY (US); Zon-Yin Shae, South Salem, NY (US); Kunwadee Sripanidkulchai, White Plains, NY (US); Shu Tao, Irvington, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/716,544

(22) Filed: Mar. 3, 2010

(65) Prior Publication Data

US 2011/0216897 A1   Sep. 8, 2011

(51) Int. Cl.
*H04M 3/00* (2006.01)

(52) U.S. Cl.
USPC ................... 379/265.11; 379/265.12

(58) Field of Classification Search
USPC ............. 379/265.09; 370/352; 709/203
See application file for complete search history.

(56) References Cited

U.S. PATENT DOCUMENTS

| | | | |
|---|---|---|---|
| 7,289,485 B1* | 10/2007 | Srinivasan | 370/351 |
| 7,418,094 B2* | 8/2008 | Golitsin et al. | 379/265.12 |
| 7,730,135 B2* | 6/2010 | Petrovykh | 709/205 |
| 8,126,133 B1* | 2/2012 | Everingham et al. | 379/265.01 |
| 2003/0032730 A1* | 2/2003 | Ogawa et al. | 525/222 |
| 2003/0058884 A1* | 3/2003 | Kallner et al. | 370/465 |
| 2003/0191632 A1* | 10/2003 | Sumner et al. | 704/201 |
| 2005/0071178 A1* | 3/2005 | Beckstrom et al. | 705/1 |
| 2005/0193055 A1* | 9/2005 | Angel et al. | 709/202 |
| 2008/0219429 A1* | 9/2008 | Mandalia et al. | 379/266.02 |
| 2010/0048242 A1* | 2/2010 | Rhoads et al. | 455/556.1 |
| 2011/0034152 A1* | 2/2011 | Khouri et al. | 455/413 |
| 2011/0151898 A1* | 6/2011 | Chandra et al. | 455/466 |
| 2011/0191134 A1* | 8/2011 | Jain et al. | 705/7.13 |

\* cited by examiner

*Primary Examiner* — Creighton Smith
(74) *Attorney, Agent, or Firm* — Louis J. Percello; Ryan, Mason & Lewis, LLP

(57) ABSTRACT

A method for a contact center to provide information to one or more users in response to one or more inquiries from the one or more users is presented. For example, the method includes accessing, using at least one client adaptor, at least one agent group that includes at least one agent having knowledge regarding the one or more inquiries. The method further includes the at least one agent responding to the one or more inquiries using the at least one client adaptor. The at least one agent group has pre-existing communications infrastructure that is accessed by a computing platform of the contact center using the at least one client adaptor.

25 Claims, 8 Drawing Sheets

PROVIDING INFORMATION BY A CONTACT CENTER

FIELD OF THE INVENTION

The present invention relates generally to contact centers for responding to user inquiries and, more particularly, to responding to user inquiries by agents sourced from a collection of agent groups comprising mobile agents, fixed-location agents, subject matter experts, contact center agents and/or enterprise agents.

BACKGROUND OF THE INVENTION

A conventional contact center may be, for example, a centralized and staffed office facility for receiving and responding to typically large volumes of requests via telephone. A call center is a type of contact center. For example, a contact center is operated by an enterprise (e.g., a company) to administer incoming product support or respond to information requests or inquiries from consumers. Outgoing calls for telemarketing, product services, and debt collection may also be made. Additionally, a contact center may also, for example, process letters, faxes, live chat, and e-mails.

A conventional contact center may typically operate in a building that houses workspaces for contact center agents. Workspaces for each agent may include, for example, a computer and a telephone. The contact center may also include one or more supervisor stations.

Many major enterprises and businesses use contact centers to interact with customers. Examples include utility companies, mail order catalogue retailers, and customer support facilities for computer hardware and software. Some businesses may service internal functions through contact centers, for example, help desks, retail financial support and sales support.

A contact center may also be known as a customer interaction center because the contact center may be, for example, a central point from which most customer contacts are managed. Through contact centers, valuable information about one or more companies may be routed to appropriate people, contacts may be tracked and data may be gathered. A contact center may be a central part of customer relationship management for a company.

SUMMARY OF THE INVENTION

Principles of the invention provide, for example, contact centers, methods, apparatus and systems for providing information to one or more users in response to one or more inquiries from the one or more users.

In accordance with a first aspect of the invention, a method for a contact center to provide information to one or more users in response to one or more inquiries from the one or more users is presented. The system comprises accessing, using at least one client adaptor, at least one agent group that includes at least one agent having knowledge regarding the one or more inquiries. The method further includes the at least one agent responding to the one or more inquiries using the at least one client adaptor. The at least one agent group has pre-existing communications infrastructure that is accessed by a computing platform of the contact center using the at least one client adaptor.

In accordance with a second aspect of the invention, a system for a contact center to provide information to one or more users in response to one or more inquiries from the one or more users is provided. The system comprises modules for implementing the above method.

In accordance with a third aspect of the invention, apparatus for providing information to one or more users in response to one or more inquiries from the one or more users is provided. The apparatus includes a memory and a processor coupled to the memory. The apparatus is configured to perform the above method.

In accordance with a fourth aspect of the invention, an article of manufacture for providing information to one or more users in response to one or more inquiries from the one or more users is provided. The article of manufacture is tangibly embodying a computer readable program code which, when executed, causes the computer to carry out the above method.

In accordance with a fifth aspect of the invention, at least one response to the one or more inquiries is provided by at least one mobile agent of the at least one agent group. The at least one mobile agent communicates with at least one of the one or more users over communications infrastructure that is independent of a service provider providing the at least one agent group. The communications infrastructure comprises a public wireless communications network. The at least one mobile agent uses one or more communication devices wirelessly coupled to the public wireless communications network.

Advantageously, principles of the invention provide, for example, (i) high quality and inexpensive mobile agents having particular skills, experience and knowledge, (ii) agent pools that may be dynamically managed and adjusted to properly match skills and knowledge of agents to required skills and knowledge needed by a contact center, and (iii) expandable contact centers.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
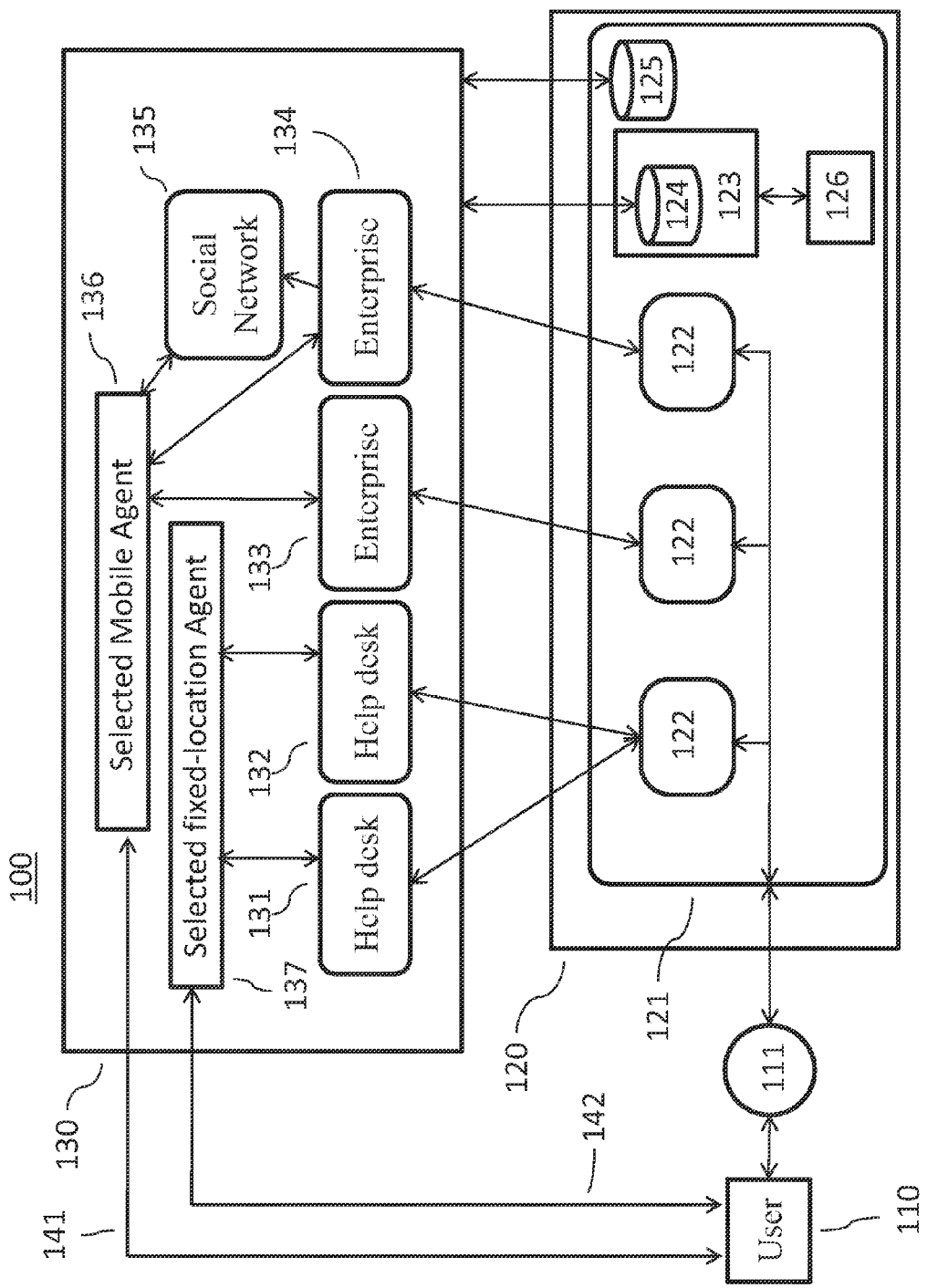
FIG. 1 is a system diagram of a contact network according to an embodiment of the invention.

Principles of the present invention will be described herein in the context of illustrative embodiments of contact networks, systems and methods for responding to user inquiries. It is to be appreciated, however, that the principles of the present invention are not limited to the specific networks, systems and methods illustratively shown and described herein. Rather, the principles of the invention are directed broadly to techniques related to responding to inquiries of users. For this reason, numerous modifications can be made to the embodiments shown that are within the scope of the present invention. That is, no limitations with respect to the specific embodiments described herein are intended or should be inferred.

As used herein, an inquiry is a communication by a user requesting information, help or an answer. As used herein, a user is an inquirer, for example, an individual, a computing device or another entity seeking help related to an application (e.g., a software application), other software, a device or a system. The user is the person, computing device or other entity initiating the inquiry. The inquiry may be, for example, via a telephone call, text message or Internet communication.

As used herein, an agent is a person or a computing device that receives or is assigned an inquiry of a user and provides a response to the inquiry to the user. An agent is associated with a contact center.

As used herein, a task is the action of responding to a user inquiry. A task is performed by typically one agent but may be performed by a plurality of agents.

As used herein, a contact center is a resource for receiving and responding to inquiries from users.

As used herein, a fixed-location agent is an agent coupled to a contact center using a dedicated communications infrastructure of the contact center, for example, a virtual private network (VPN) of the contact center. The dedicated communications infrastructure may include, for example, one or more wired networks and/or one or more satellite communications links. The dedicated communications infrastructure does not include cellular communications infrastructure available to the general public (public cellular communications infrastructure) or a cellular communications network available to the general public (public cellular communications network). Fixed-location agents may or may not physically reside at a contact center building. Fixed-location agents may, for example, work from a remote office (e.g., a home office). Fixed-location agents connect to users through the dedicated communication infrastructure of the contact center. Fixed-location agents typically may be available during customary set time periods. Because there is a trend for 24 hour per day availability of fixed-location agents, a customary time period may be, for example, 24 hours per day.

As used herein, a mobile agent is an agent coupled to or communicating with a user using a non-exclusive communications infrastructure not dedicated to exclusive use of a contact center and/or agents of the contact center. A mobile agent, for example, may be coupled to or communicate with the user by a general use (e.g., not dedicated to the contact center, the user of the contact center and agents of the contact center) wireless communications network, for example, a public cellular communications network. The mobile agent may use a cellular phone or other device to couple to the public cellular communications network (e.g., a computer coupled to the cellular communications network). The mobile agent does not physically residing in a centralized contact center office facility.

The mobile agent, at least at some point in time, communicates with the user over only communications infrastructure that is independent of the service provider providing the agent or the group of agents that the agent belongs to. This communications infrastructure may comprise, for example, a public wireless communications network.

As used herein, a fixed location contact center is a contact center using, employing or having agents that are fixed-location agents and not using, employing or having agents that are mobile agents.

As used herein, in telecommunications, call management services are the process of forming and implementing rules and parameters for routing of telephone calls through a network.

As used herein, a platform provider provides a computing resource (e.g., comprising a computing device and/or software), computing service and/or call management services (e.g., phone or cellular phone call management services). The provided computing resource is known herein as a platform (e.g., a platform in the cloud). The platform provider may optionally function as a service provider.

As used herein, a service provider is an entity that provides agents and/or other services using the framework of a platform provider by using a set of application programming interfaces (APIs). The service provider entity may be, for example, an individual or an enterprise (e.g., company, university, association of experts in a particular subject matter, or other organization).

As used herein, a client adaptor (e.g., a user client adaptor or service provider client adaptor) is a system component (e.g., a device and/or software) that interfaces a client (e.g., a user, a service provider or a client thereof) to a server, platform or application. A user, a service provider or other entity may access or contact a platform by using one or more client adaptors. The user, service provider or other entity may provide the one or more client adaptors. The user, service provider or other entity may contact or access the platform by accessing the client adaptor. The platform may contact or access the user, service provider or other entity through the client adaptor of the user, service provider or other entity. Communication between a user and a service provider may be between client adaptors of the user and the service provider. A client adaptor of a user may function as a set of local help desk extension numbers for the user to call for help by manipulating a dial plan. A client adaptor of a user may seamlessly bridge an original call of the user with an incoming call request from the service provider. A client adaptor of a user may have knowledge to establish communication channels for the user.

A user client adaptor may be operative for a user to initially communicate with a platform to process a user inquiry (e.g., process a phone call from the user), to retrieve information about the user (e.g., user profile) and to provide subsequent communication with the user regarding the inquiry (e.g., respond to the inquiry). After an agent has been selected to respond to the user inquiry, the client adaptor will communicate with a service provider client adaptor to seamlessly transfer the current inquiry (e.g. transfer the current call from the user) to the selected agent to establish direct communications between the user and the agent. The transfer of the current inquiry does not require any further actions by the user. The direct communications comprise, for example, telephone communications (e.g., cellular phone communications in the case of mobile agents).

A service provider client adaptor may be operative for a service provider to seamlessly provide (e.g., plug in or couple) service of the service provider (e.g., respond to user inquires by one or more mobile agents of the service provider) through a platform without changing any existed dial plans or existing workflows (e.g., call management or service workflows) of the service provider. The service provider client adaptor does this by, for example, specifying a call management or service workflow of the service provider and specifying required parameters (e.g., call routing parameters) for the platform to use after the platform has selected an agent (e.g., an agent of the service provider) to provide a response to the inquiry. The service provider client adaptor may be further operative to then communicate with the user client adaptor for completing the direct communication channel between user and agent and/or providing direct communications between the user and agent.

A client adaptor may be further operative to provide the above described functions of client adaptors and to enable communications involving, for example, a user, an agent, a service provider or clients thereof without modifying existing communications and/or information technology infrastructure of the service provider, other than to plug-in or couple to the client adaptor(s). For example, using one or more client adaptors, an agent group (e.g., agent groups 231-233) may be accessed. The agent group may have pre-existing (e.g., pre-existing prior this or any previous communications with a platform of a service provider) communications and/or information technology infrastructure that may be accessed by, for example, a platform (e.g., platform 121) of or used by the contact center using the one or more client adaptors (e.g., user and/or service provider client adaptors).

As used herein, a dial plan is a set of rules that govern communication and routing between two communication end points, for example, in a voice or Internet protocol (VoIP) communication infrastructure. For example, a dial plan may be operative to decide which gateway to use at what time when a caller calls a receiver. The call plan may be, for example, an important or main control point for the VoIP infrastructure. An enterprise with a VoIP phone system has typically made a large investment or expenditure to design and deploy a dial plan of the enterprise. Changing a dial plan is, therefore, undesirable and may require a significant effort and/or expenditure. A client adaptor, using an existing dial plan, may be operative to provide communications between a user and an agent of the service provider.

As used herein, a plug-in comprises a computer program that interacts with a host application (e.g., host computer program) to provide a function on demand. The plug-in computer program may be available on demand and as needed.

The phrase cloud computing, as used herein, implies Internet based development and use of computing resources and technology. In concept, some details of the computing resources may not be known by those using the computing resources. Those using the computing resources may no longer need knowledge of, expertise in, or control over technology infrastructure used. Cloud computing describes a relatively new supplement, consumption and delivery model for information technology (IT) services based on the Internet. Cloud computing typically involves the provision of dynamically scalable and often virtualized resources as a service over the Internet. The term cloud is used as a metaphor for the Internet and Internet provided services, based on cloud drawings sometimes used to depict the Internet in computer network diagrams as an abstraction of the underlying infrastructure it represents. Typical, cloud computing providers may deliver common business applications online which may be accessed from a web browser, while the software and data are stored on servers.

The term crowd sourcing, as used herein, is taking one or more tasks, which may have been traditionally performed by an employee or conventional contractor, and distributing the one or more tasks to members of a group of people or a community (i.e., the crowd). Crowd souring recruitment of members from the crowd may be through an "open call" to a large group of people (i.e., the crowd), asking for people to perform the one or more tasks. Members of the crowd who are selected to perform the one or more tasks may be called agents. The open call may be through the Internet. Internet crowd sourcing, as used herein, is crowd sourcing wherein communication with the agent is, at least in part, through the Internet, for example, the open call is through the Internet and/or communication with the agent in an assignment and/or performance of an assigned task is through the Internet.

The Session Initiation Protocol (SIP) is a signaling protocol that may be used for controlling multimedia communication sessions such as voice and video calls over Internet Protocol (IP). The protocol may be used for creating, modifying and terminating two-party (e.g., unicast) or multiparty (e.g., multicast) sessions comprising one or several media streams. The modification can involve changing addresses or ports, inviting more participants, adding or deleting media streams, etc. Other feasible application examples include video conferencing, streaming multimedia distribution, instant messaging and presence information.

As used herein, the term enterprise is understood to broadly refer to any entity that is created or formed to achieve some purpose, examples of which include, but are not limited to, a company, an undertaking, an endeavor, a venture, a business, a concern, a corporation, an establishment, a firm, an organization, or the like.

Agent resources in fixed-location contact centers are expensive and have limited scalability of the number of available agents and of telecommunication resources. The fixed-location contact centers typically have a fixed and not easily expandable set of phones circuits to use. The fixed-location contact centers may have a set of agents that is not easily expandable. Increasing the number of phone circuits and agents is limited.

In a contact center office, agents with different shifts and/or supporting different customer accounts may share the same desk and phone.

According to principles of the invention, contact centers may be expanded to include mobile agents, for example, mobile agents obtained from Internet crowd sourcing. Mobile agents may be obtained or recruited from social networking (e.g., social networking Internet sites). Contact centers comprising mobile agents are herein termed mobile agent contact centers. Note however, that an agent pool of a mobile agent contact center may include only the mobile agents or a mix of mobile agents and fixed-location agents. For example, a contact center may transform the entire employee work force of the contact center into mobile agents.

The mobile agents may be high quality and/or inexpensive or free agents. Mobile agents may have particular skills, experience or knowledge.

Advantageously, mobile agent contact centers may have agent pools that may be dynamically managed and/or adjusted to properly match skills and knowledge of agents to required skills and knowledge needed by the contact center. In a dynamic mobile agent contact center, entities or enterprises (e.g., entities or enterprises accessible using "plug-in" computer programs) may provide mobile agents. The entities or enterprises may be, for example, service providers or contractors. For example, a service provider or contracted enterprise may provide agents having particular skills, experience or knowledge.

A platform may be used for crowd souring and implementing the function of mobile agent contact centers. Groups of mobile or fixed-location agents (e.g., groups having one or more specific knowledge areas) may access the platform by plug-in software or services.

FIG. 1 is a system diagram of contact network 100 according to an embodiment of the invention. A contact network may include a system for sourcing agents. Contact network 100 comprises cloud computing resources 120 (e.g., Internet provided computing resources) and agent resources 130 and a wireless communications network 141. The cloud computing resources 120 comprises platform 121 comprising plug-in modules 122 (e.g., software modules). The plug-in modules 122 may comprise, for example, one or more user client adaptors and/or one or more service provider client adaptors. The plug-in modules 122 may be operative for accessing agent resources 130. Agent resources 130 comprise help desk 131, help desk 132, enterprise 133, enterprise 134 and social network 135, all of which comprise agents. In the contact network 100, both help desks 131 and 132 are coupled to (e.g., in accessible to or communications with) a plug-in software module 122, enterprise 133 is coupled to another plug-in software module 122 and enterprise 134 is coupled to yet another plug-in software module 122. Social network 135 is coupled to enterprise 134. A user 110 is coupled to the platform 121 in the cloud 120 through a client adaptor 111. In the contact network 100, the provider of platform 121 (i.e. the platform provider) may also be the service provider. The plug-in software modules 122 for plug-in of services may be within the platform 121. Alternate arrangements are contemplated. For example, the user client adaptor 111 may be within the platform 121 or the services may be provided outside of the platform but coupled to the platform by one or more client adaptors of the service provider. Agent resources 130 comprise mobile agents coupled to the wireless communications network 141. The wireless communications network may comprise, for example, a public cellular communications network.

Figure 2:
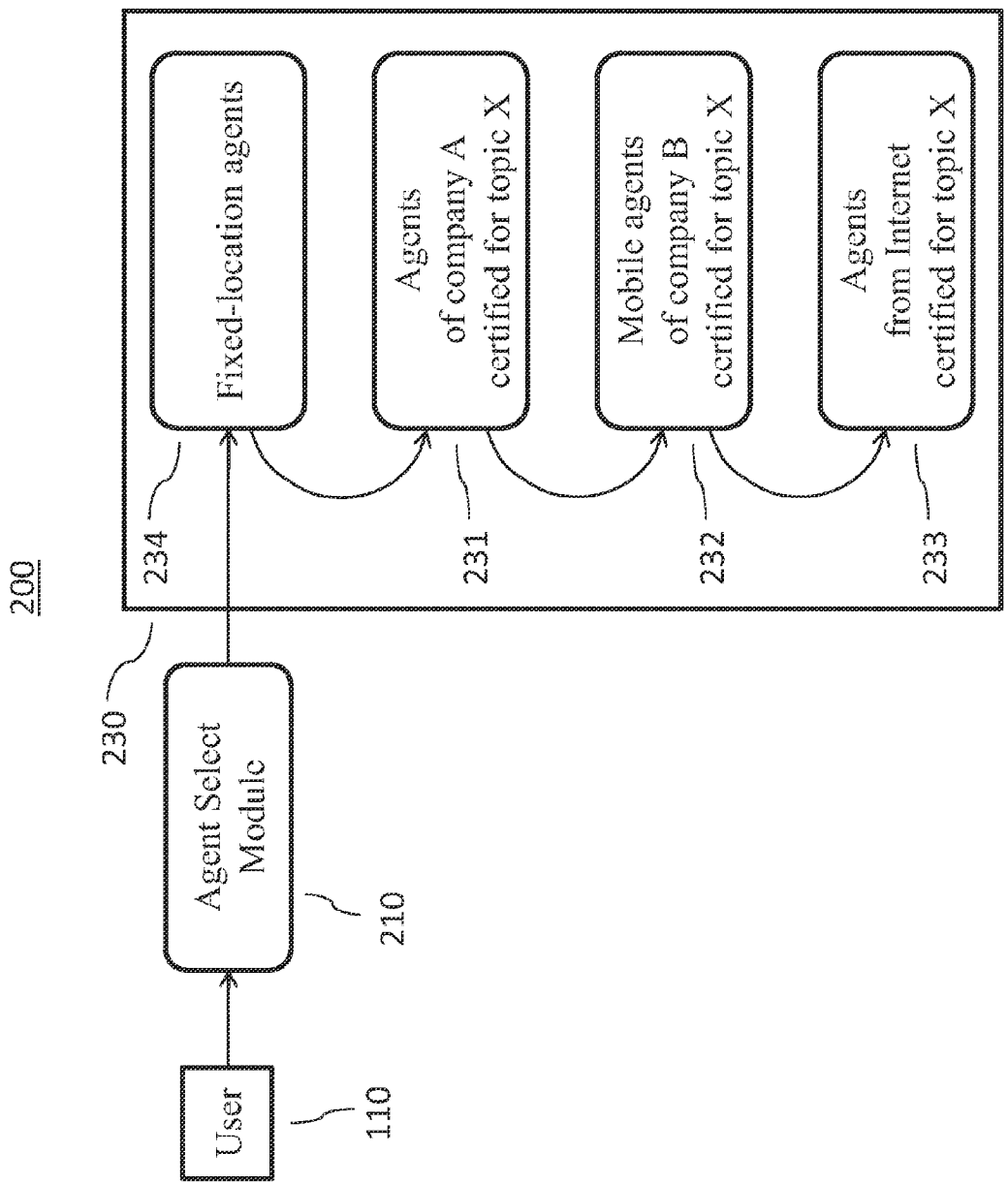
FIG. 2 is a diagram of a call management workflow system according to an embodiment of the invention.

FIG. 2 is a system diagram of a call management workflow system 200 according to an embodiment of the invention. The call management workflow system 200 may, for example, determine and/or perform one or more workflows. As used herein, a workflow (e.g., a call management or service workflow) may comprise the method, steps, rules and/or process for selecting one or more agents to respond to a user inquiry and may be operative to assist or enable the one or more agents to respond to the user inquiry. The call management workflow system 200 is used by user 110 of company A having an inquiry concerning topic X. Company A may be, for example, the company employing, managing or owning a contact center and/or a contact network used to receive, process and respond to the inquiry of user 110. An example of this case is an employee of company A requesting help from a help desk of the company. The call management workflow system 200 comprises agent select module 210 and agent resources 230 comprising a fixed-location agent group 234, a company A agent group 231, a mobile agent group 232 and an Internet agent group 233. Note that company A, company B are examples of enterprises. Other enterprises for providing agent groups are contemplated. Furthermore, Internet agent group 233 may be provided by an enterprise. The enterprise may be other than the contact center.

The agent select module may be, for example, a component of a platform (e.g., platform 121) and the agent resources 230 may be, for example, at least part of agent resources 130.

The user is coupled to the match and select module 210, for example, through a client adaptor (e.g., client adaptor 111). The match and select module is coupled to each agent group 231-234 and functions to select the agent groups 231-234 according to specific criteria that may include, for example, the knowledge of the agent groups regarding topic X. By way of example only, there may be a plurality agent groups that includes agent groups in addition to agent groups 231-234. The plurality of agent groups is knowledgeable in a number of areas or topics. Agent groups 231-233 were selected from the plurality of agent groups at least in part because groups 231-233 were knowledgeable in topic X or had knowledge most closely related to topic X than did other agent groups of the plurality of agent groups. Agent groups may comprise agents knowledgeable in different topics or areas. Agent groups 231-233 may have been selected because they each had one or more agents knowledgeable in topic X.

Each agent of agent groups 231-233, including each mobile agent, is certified to have knowledge about one or more particular subjects or topics.

As mentioned above, agent groups may be selected, at least in part because the agent group includes at least one agent knowledgeable in the subject of the inquiry. Thus, the selection of agent groups may be considered to be the at least part of the process of selecting of an agent to respond to the inquiry. The criteria for selecting an agent (i.e., mobile agent or fixed-location agent) in at least agent groups 231 to 233 may include that the agent is knowledgeable in the subject of the inquiry (e.g., topic X) and may additionally include one or more of the following: (i) availability of the agent; (ii) a quality factor representing the quality of responses from the agent to past inquiries; (iii) a quality factor representing the quality of responses to past inquiries from a service provider providing the agent; (iv) geographic location of the agent; (v) geographic location of the service provider; and (vi) geographic location of the user. For example, it may be desired to have the agent or the service provider of the agent located near or within a certain distance or closest to the user.

The call management workflow of the call management workflow system 200 may be defined by the platform provider. A call management workflow defined by a platform provider may be the same for each user and for each user inquiry. By way of a non-limiting example only, the call management workflow may assign tasks at least in part according to a predetermined priority of agents or agent groups. The highest priority for assignment may be to an agent of the fixed-location agent group 234. The fixed-location agent group 234 may comprise, for example, employees of company A and/or a traditional company dedicated agents of a contact center or help desk. Alternately, the fixed-location agent group 234 may comprise fixed-location agents of another company or enterprise. For example, the fixed-location agent group 234 may not be experts or especially knowledgeable in the subject of inquiry (e.g., topic X), but may be an agent of first contact for the user and/or an agent filtering inquiries or routing inquiries to other agents (e.g., agents of agent groups 231-234).

Second highest priority may be to an agent of company A agent group 231. The company A agent group 231 may comprise either or both of mobile and fixed-location agents. The company A agent group 231 may be employees of company A. The third highest priority for assignment may be to a mobile agent of the mobile agent group 232. Agents of the mobile agent group 232 may not be direct employees of company A, but employees of company B. Company B may be, for example, a service provider or a contractor contracted by company A. The fourth highest priority may be to an agent of the Internet agent group 233. The Internet agent group 233 comprises mobile and or fixed-location agents sourced or obtained from the Internet by crowd sourcing. An agent of the Internet agent group 233 may be solicited by an open solicitation on the Internet, the invitation accessible to the general public or a targeted audience (e.g., an industry or academic audience). The selected agent of the Internet agent group 233 may be, for example, an agent who fulfills only the present task and has never responded to a past task or past user inquiry. For this case, agent registration may apply only to the current task. Alternately, the selected agent may have fulfilled previous tasks and have registered previously. Crowd or Internet sourced mobile agents, as well as other mobile agents, (e.g., agents of agent groups 231-233) may be available on an ad hoc basis (e.g., be available for the current task with future availability or need undetermined).

Compensation (e.g., monetary compensation) to one or more mobile or fixed-location agents and/or to the service provider may be according to quality of service provided by the one or more agents or the service provider.

After routing of the inquiry to a selected agent (e.g., a selected mobile agent), a communication session is established between the user and the agent. For example, if the selected agent is a mobile agent, the communications session may be carried by wireless communications network 141.

Referring back to the contact network 100 of FIG. 1, the help desks 131 and 132 comprise agents. Agents of help desks 131 and 132 are typically non-mobile agents (e.g. fixed-location agents of fixed-location agent group 234). However a help desk is contemplated having partly or entirely mobile agents (e.g., a virtual help desk). Enterprise 133 and 134 may, or may not, comprise mobile agents (e.g., mobile agents of one or more agent groups 231-233). Mobile or fixed-location agents may be obtained from the social network 135, for example, by enterprise 134 using crowd sourcing. A contact network (e.g., the contact network 100) may comprise the call management workflow system 200.

As mentioned previously, the contact network 100 comprises the wireless communications network 141. The wireless communications network 141 is configured to couple the user 110 to a selected mobile agent 136. The contact network 100 further comprises a wired communications network 142 configured to couple the user 110 to a selected fixed-location agent 137.

If a mobile agent is selected for a task, then the wireless communications network 141 is used for a communication session between the user and the selected mobile agent 136. Each mobile agent communicates with one or more communication devices wirelessly coupled to the wireless communications network 141. The wireless network may comprise, for example, a cellular phone network. The wireless communication devices may include, but are not limited to, one or more cellular phones, one or more computing devices coupled to a cellular phone network and one or more processing device (e.g., processing devices coupled to one or more memory devices) coupled to a cellular phone network. The wireless communication devices may comprise or run software to implement methods of the invention, for example, to access the wireless communications network 141 and to respond to the inquiry of the user 110. The selected mobile agent 136 may belong to enterprise 133, enterprise 134 or social network 135.

If a fixed-location agent is selected for the task, than a wired communication network 142 is used for a communication session between the user and the selected fixed-location agent 137. Each fixed-location contact agents communicates using devices wired to the wired communications network 142.

In one embodiment of the invention, the selected mobile contact agent 136 belongs to enterprise 134 and obtaining information by crowd sourcing for the selected mobile agent 136 to form a response to an inquiry of the user 110.

The contact network 100 further comprises a registration system 123 for registering each agent, including mobile agents. The registration system comprises the registration database 124 and may be part of platform 121. The registration database 124 comprises one or more subjects that each agent (e.g., agent 301 of FIG. 3) is knowledgeable about and contact information for the agent. The contact information may comprise, for example, cellular phone number, interne address, email address or Uniform Resource Locators (URL) for the agent.

The contact network 100 may further comprise a dial plan 126. The dial plan 126 is operative to maintain and update a database of agent phone numbers (e.g., cellular phone numbers of mobile agents) and may, optionally, automatically call agents to respond to user inquires. The database of agent phone numbers may be, for example, at least part of the registration database 124 or obtained from the registration database 124. The dial plan 126 and database of agent phone numbers may be configured to be updated without affecting ongoing operations of the contact network.

The contact network 100 further comprises an inquiry database 125 for storing information related to one or more user inquiries. At least a portion of the stored information is made available or provided to one or more mobile agents of the mobile agents of enterprises 133 and 134 or social network 135, during communication sessions between the user and the one or more mobile agents. In another embodiment, the stored information is made available or provided to one or more fixed-location agents or a combination of mobile agents and fixed-location agents. For example, the stored information may be provided by one or more Internet pages formed, at least in part, after an inquiry from a user is received and before the inquiry is routed to the one or more mobile agents or fixed-location agents. The inquiry database 125 and may be part of platform 121.

Figure 3:
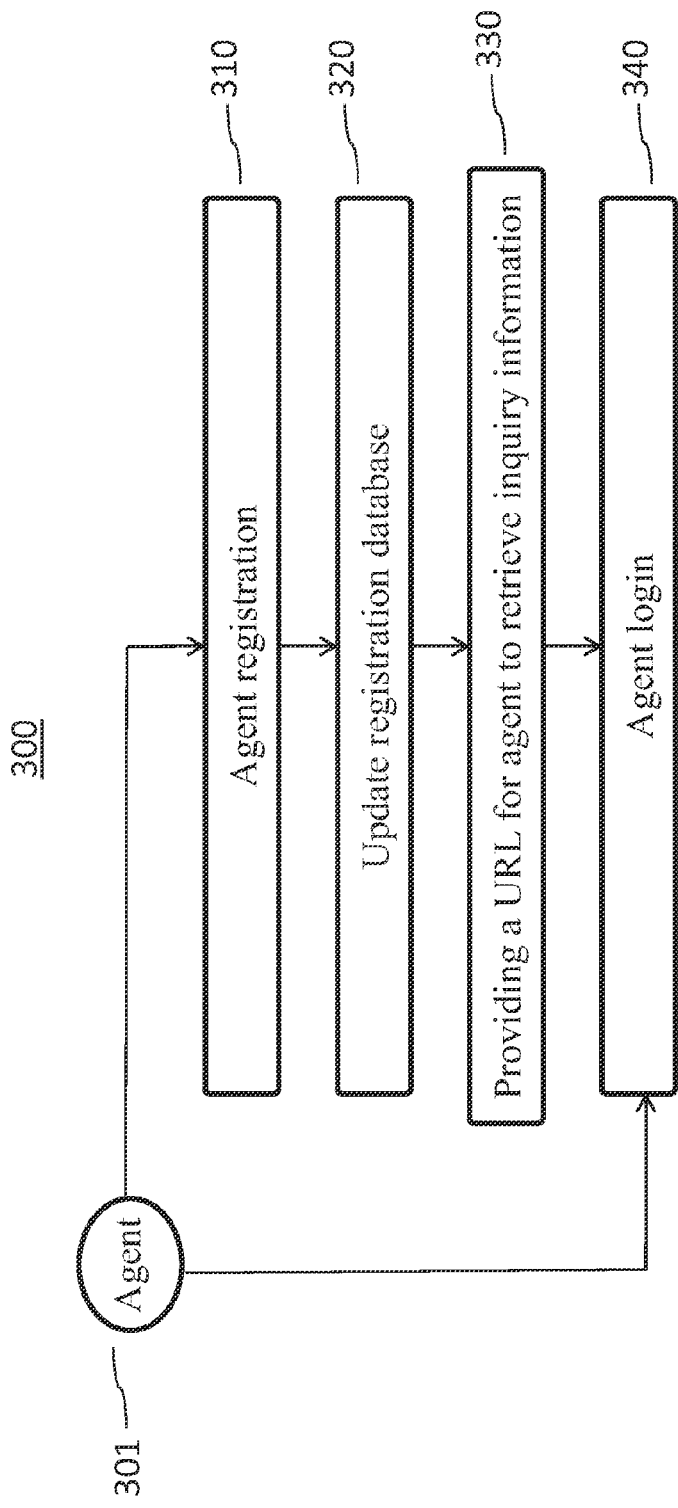
FIG. 3 is a flow diagram of a method for agent registration and login according to an embodiment of the invention.

FIG. 3 is a flow diagram of a method 300 for agent registration and login according to an embodiment of the invention.

Step 310 comprises registration of an agent 301. Agent 301 may be a mobile agent or a fixed-location agent. Registration of agent 301 comprises (i) establishing that the agent 301 is knowledgeable about one or more particular subjects and (ii) the agent 301 providing agent contact information for the agent 301. Establishing that the agent 301 is knowledgeable about one or more particular subjects may comprise, for example, certification or presentation of credentials (e.g., diploma, license, experience, test results or the like). Contact information may comprise, for example, cellular phone number, internet address, email address or Uniform Resource Locators (URL) for the agent 301.

Step 320 comprises updating a registration database (e.g., registration database 124) to include (i) identifiers of the particular subjects in which agent 301 is knowledgeable and (ii) the agent contact information.

Step 330 comprises providing agent 301 with an agent specific URL for agent 301 to use to retrieve information related to one or more future inquiries related to one or more tasks that agent 301 may be selected to perform. The URL is an address of one or more Internet pages providing information, from an inquiry database (e.g., inquiry database 125) regarding the one or more future inquiries. The URL may be provided to agent 301 by storing the URL in one or more communications devices (e.g., cellular phone or computing device) of the agent 301, the communications devices having access to the wireless network 141.

Step 350 comprises login of the agent 301. Login of agent 301 makes agent 301 accessible to the contact network 100.

Figure 4:
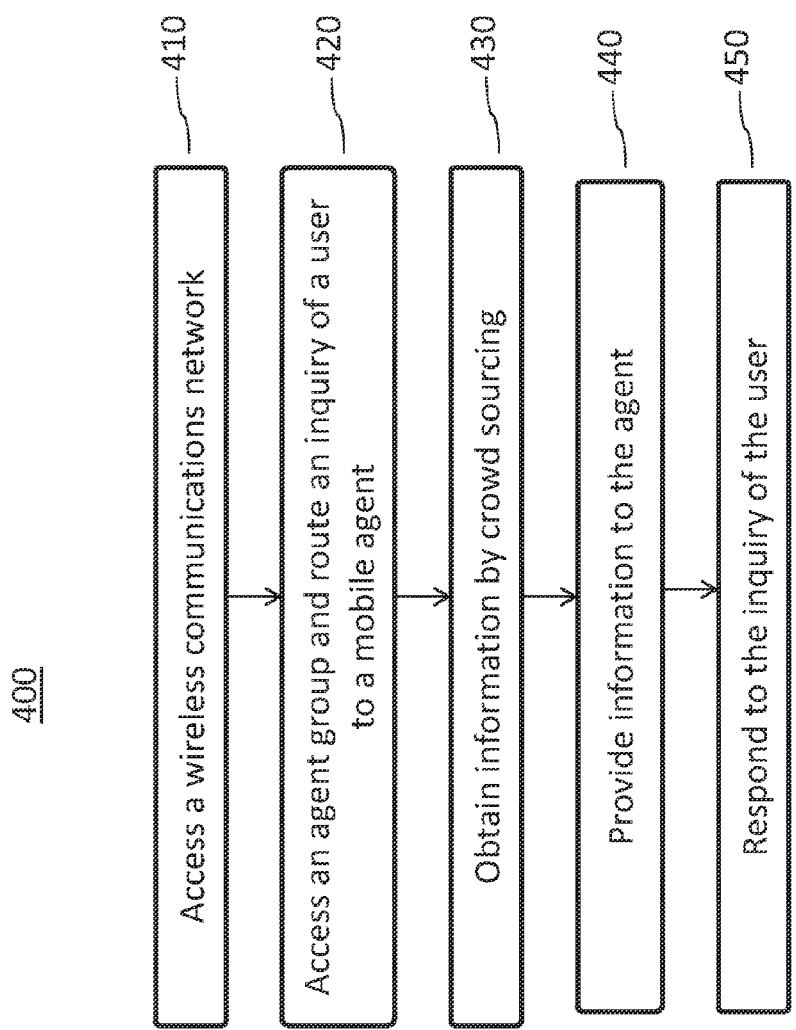
FIG. 4 is a flow diagram of a method for a contact center to provide information to a user in response to an inquiry from the user according to an embodiment of the invention.

FIG. 4 is a flow diagram of a method 400 for a contact center to provide information to a user in response to an inquiry from the user according to an embodiment of the invention. Steps of method 400 may be performed in the order shown in FIG. 4 or in different orders. In the description of method 400, the term agent may refer to either a mobile agent or a fixed-location agent.

Step 410 comprises accessing a public wireless communications network (e.g., wireless communications network 141) by at least an agent (e.g., selected mobile agent 136) and the user (e.g., user 110) and optionally by a platform (e.g., platform 121). The wireless network may be accessed by the platform and the agent to alert the agent to a task of responding to the inquiry after selection of the agent to perform the task. The agent and the user may access the wireless communications network in step 450.

Step 420 comprises accessing an agent group and routing the inquiry to the agent who was selected to answer the inquiry. The accessing uses at least one client adaptor. A selected agent group comprising the agent having knowledge about a topic of the inquiry is accessed. Accessing the selected agent is considered as accessing the selected agent group. The routing may be, for example, according to the workflow system 200. The selected agent group may have pre-existing communications infrastructure that is accessed by a computing platform of the contact center using the at least one client adaptor.

Step 430 is optional and comprises obtaining information to respond to the inquiry from crowd sourcing. Crowd sourcing may be used to find and recruit the agent to respond to the inquiry and/or crowd sourcing may be used by the selected agent to obtain information to use in formulating a response to the inquiry.

Step 440 comprises providing the agent with information from a database of stored information related to the inquiry. The information may be provided to the agent during a communication sessions between the agent and the user. The information may be provided by one or more Internet pages formed, at least in part, after the inquiry is received and before the inquiry is routed to the agent. The information may be available, for example, by the agent accessing the agent specific URL described in step 330 of method 300.

Step 450 comprises the selected agent responding to the user regarding the inquiry. In responding to the user, the agent establishes a communications session with the user and communicates with the user using one or more communication devices wirelessly coupled to one or more wireless communications networks. For example, one or more client adaptors (e.g., user client and/or service provider adaptors) are used for the user to respond. Optionally, fixed-location agents may respond to other inquiries of users.

Note that a plurality of agents may be selected to respond to an inquiry and/or a plurality of agents may respond to an inquiry. Thus agents may collaborate in responding to an inquiry. By way of example only, an agent selected to respond to an inquiry may recruit or receive assistance from another agent in responding to an inquiry.

Figure 5:
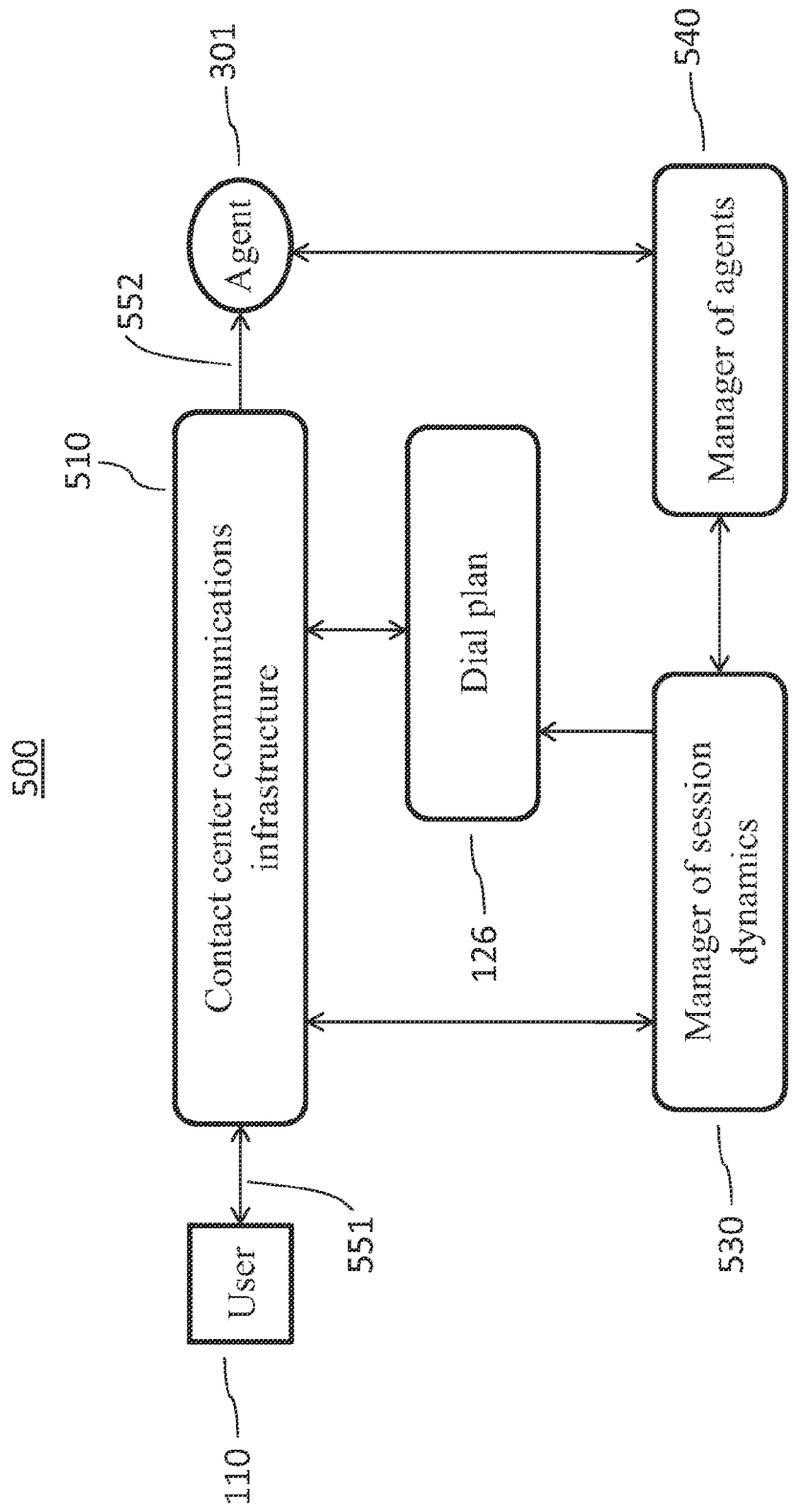
FIG. 5 is a system diagram of contact network illustrating communications infrastructure coupling a user to an agent according to an embodiment of the invention.

FIG. 5 is a system diagram of contact network 500 illustrating communications infrastructure coupling a user 110 to an agent 301 according to an embodiment of the invention. The contact network comprises a contact center communications infrastructure 510, the dial plan 126, a manager of session dynamics 530 and a manager of agents 540.

The contact network 500 is accessed by user 110 who presents an inquiry initiating a session having an objective of an agent 301 (e.g., a mobile agent) responding to the inquiry of the user. The user 110 contacts the contact center communications infrastructure 510 over communications link 551. Communications link 551 may be a wired or a wireless link, for example, a wired telephone network, a cellular telephone network or the Internet. Communications may be in the form of voice, video and/or text. As a communications device, the user may use, for example, a wired phone, a wireless phone and/or a computer.

The contact center communications infrastructure comprises at least a portion of the communications infrastructure coupling the user 110 to the agent 301 and used for communications between the user 110 and the agent 301. For example, the contact center communications infrastructure may comprise VoIP or other packet switched network. The contact center communications infrastructure 510 is typically, but not necessarily, located, at least in part, in a physical facility of the contact center. Link 552 connects the agent 301 with the contact center communications infrastructure 510. Link 552 may be, for example, a wireless communications network or link coupled to a wireless communications device of the agent 301.

Session management is performed by the manager of session dynamics 530. The manager of session dynamics 530 may manage obtaining the inquiry from the user 110, providing the inquiry to the agent 301, obtaining the response from the agent 301, providing the response to the user 110, and communications between the user 110 and the agent 301. The manager of session dynamics 530 is coupled to the contact center communications infrastructure 510.

The manager of agents 540 manages the formation of the agent resources (e.g., agent resources 230) and dynamically selects an agent group (including mobile agents) that may be knowledgeable about the subject or topic of the inquiry. The agent selected to respond to the inquiry (e.g., the selected mobile agent 136) will come from this agent group. The manager of agents 540 may also manage agent registration (e.g., by the method 300). The manager of agents 540 is coupled to at least agent 301 and is coupled to the manager of session dynamics 530. The manager of session dynamics provides the inquiry and, optionally, the information about the user (e.g., identification and an application the inquiry is related to) to the manager of agents 540. The manager of agents 540 provides the agent group that may be knowledgeable about the subject or topic of the inquiry to the manager of session dynamics 530. The manager of session dynamics 530 may, for example, comprise or manage the agent select module 210 to further select the agent to respond to the inquiry. The contact center dial plan 126 is coupled to and managed by the manager of session dynamics 530 which may modify, update or add to the dial plan 126 including updating or adding cellular phone numbers of mobile agents. The contact center dial plan 126 is further coupled to the contact center communications infrastructure 510 to provide, for example, the phone number (e.g., cellular phone number) of the agent selected to respond to the inquiry to the contact center communications infrastructure 510. At this point, the contact center communications infrastructure 510 may route the call from the user 110 to the agent 301. Alternately, the contact center communications infrastructure 510 may call the agent 301 informing the agent 301 that the agent 301 has been selected to respond to the inquiry of the user 110.

Figure 6:
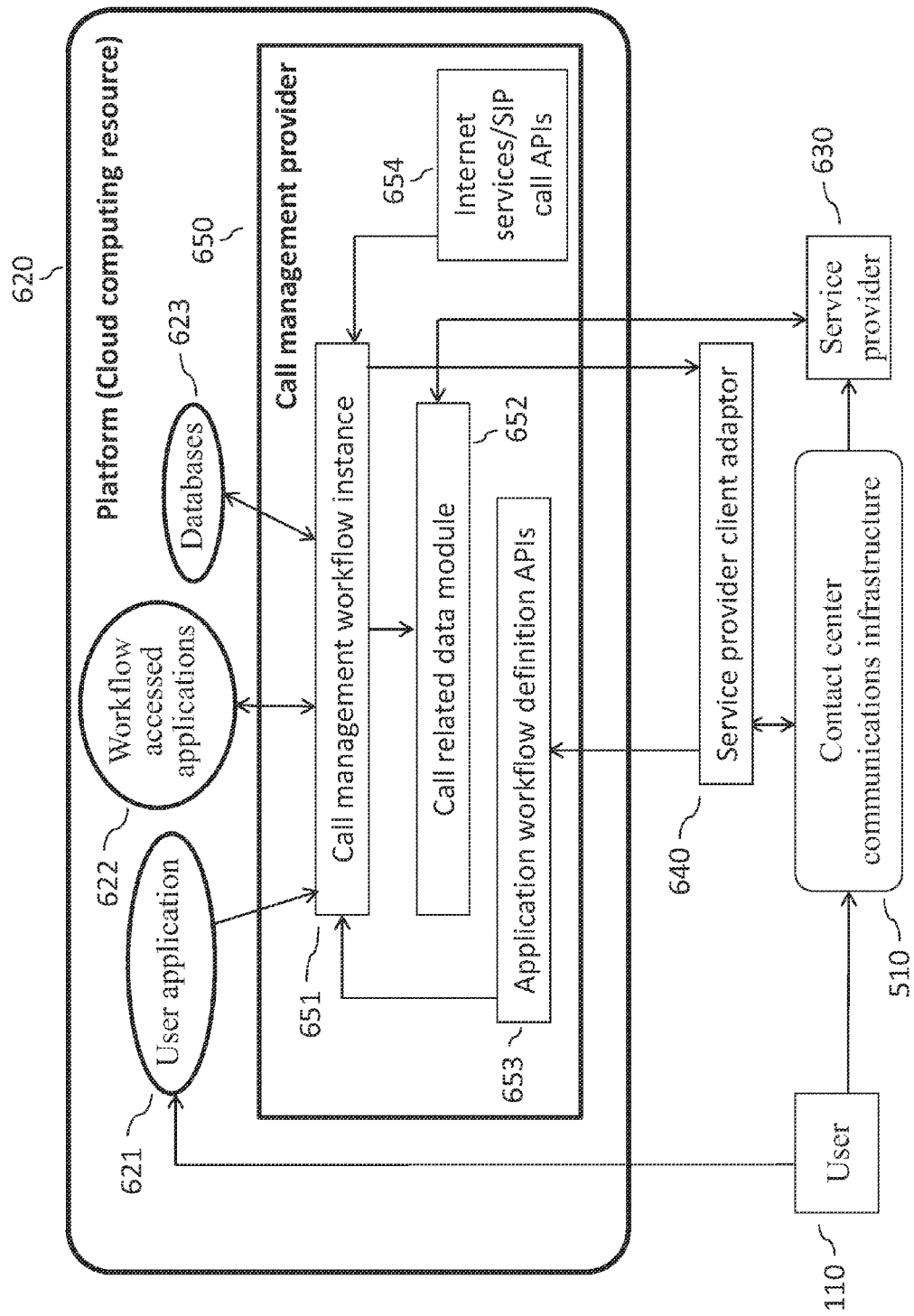
FIG. 6 shows a crowd sourcing system for a user to present an inquiry through an Internet application or through a user application according to an embodiment of the invention.

FIG. 6 shows a crowd sourcing system 600 for a user 110 to present an inquiry through an Internet application or through a user application according to an embodiment of the invention. The crowd sourcing system 600 comprises a platform 620, contact center communications infrastructure 510, service provider 630 and a service provider client adaptor 640. In this embodiment, the platform may comprise, for example, a cloud computing resource. The crowd sourcing system 600 is coupled to and accessed by user 110 as well as the service provider 630. The user 110 and the service provider 630 are further coupled to the contact center communications infrastructure 510 at least enabling communications between the user 110 and the service provider 630.

As mentioned above, the service provider provides one or more agents. Note that there may be more than one service provider, each service provider providing one or more agents to potentially respond to inquiries of users. For example, different service providers may provide agents knowledgeable in different subjects, or different service providers may provide agents from different sources (e.g., one enterprise, another enterprise or crowd sourcing).

Using the crowd sourcing system 600 the user 110 presents an inquiry using user application 621. User application 621 may be, for example, an application available to the user 110 over the Internet. As such, user application 621 may be considered an Internet application. The user application 621 forwards the inquiry to a call management workflow instance 651 at the call management provider 650 using API(s) and relevant parameters. The call management provider 650 may have one or more SIP call APIs 654. Application workflow related APIs 653 (e.g., API defining the application workflow) are provided to or coupled to the call management workflow instance 651. The platform 620 executes the workflow instance 651 to obtain information to respond to the inquiry, for example, to select the service provider 630 to respond to the inquiry (i.e., to select the service provider 630 to provide an agent to respond to the inquiry), to access the selected service provider 630, and to provide the inquiry to the selected service provider 630. The workflow instance 651 may comprise, for example, accessing one or more databases 623, accessing one or more workflow accessed applications 622, and using people to perform at least a portion of the workflow instance 651. The workflow accessed applications 622 may comprise, for example, Internet or web services. The databases 623 may comprise, for example, databases associated with the workflow accessed applications 622 or databases comprising knowledge or facts relevant to answering the inquiry. Such knowledge or facts may be provided, through call related data module 652, to the service provider 630 to use in responding to the inquiry. The call management workflow instance 651 is coupled to the user application 621, the one or more workflow accessed applications 622, the one or more databases 623 and the call related data module 652. The call related data module 652 is further coupled to the service provider 630.

The call management workflow instance 651 is further coupled to the service provider client adaptor 640 of the selected service provider 630. The call management workflow instance 651 provides the service provider client adaptor 640 needed communications setup information (e.g., user 110 and service provider 630 phone number or numbers, service provider client phone number or numbers, text chat, URLs and/or other setup information). The setup information may be, for example, setup information for multi-channel communication. The service provider client adaptor 640 is coupled to the user 110 at least through the contact center communications infrastructure 510.

The service provider client adaptor 640 sets up the communications connection (e.g., voice and/or data connection) between user 110 and the service provider 630 using the contact center communications infrastructure 510.

The service provider 630 responds to the communications connection (e.g., answers a phone call) and, optionally, access inquiry related information in or provided by the call related data module 652 and accessible using, for example, one or more URLs (e.g., one or more agent specific URLs described in step 330 of method 300).

Figure 7:
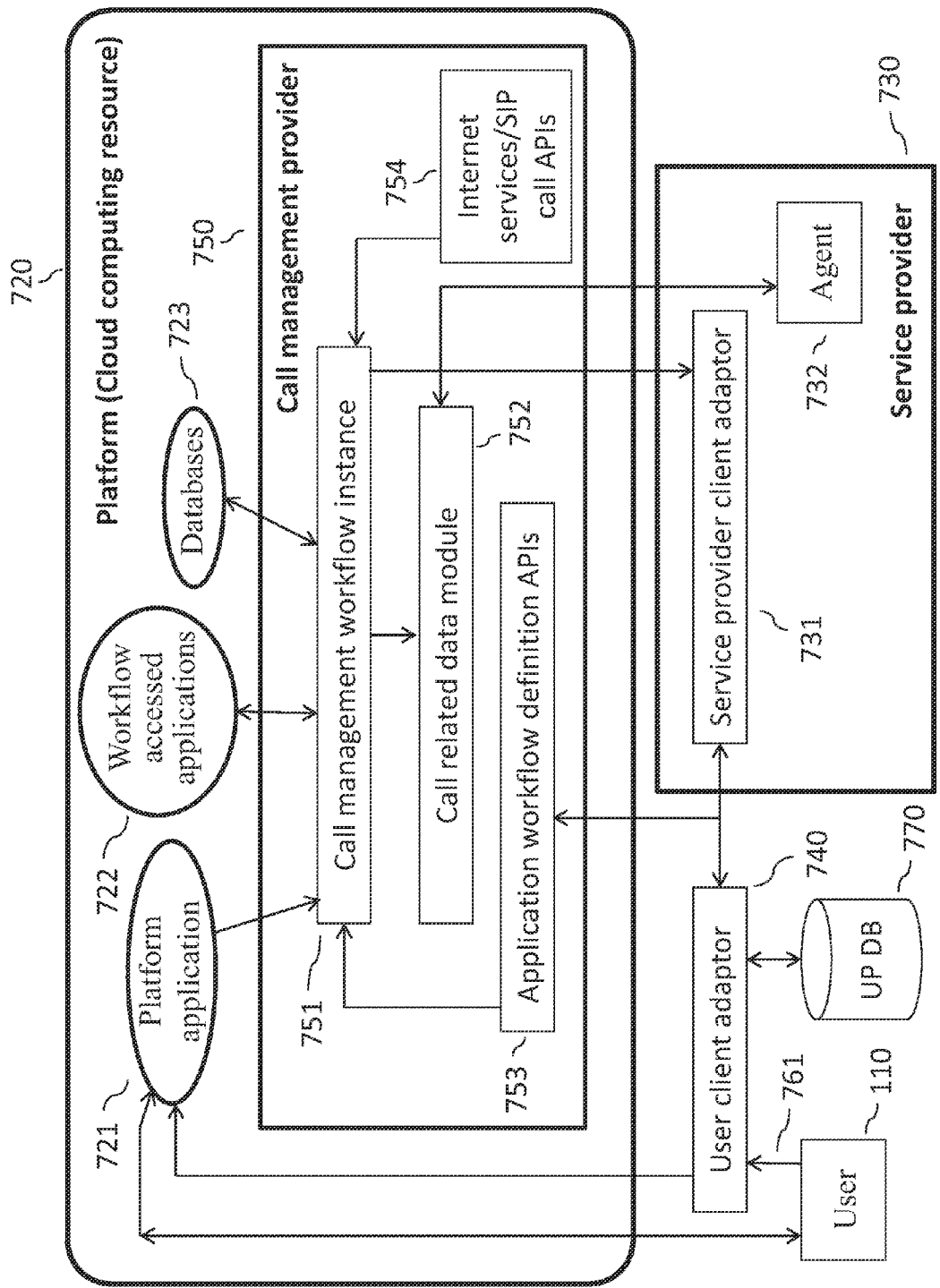
FIG. 7 shows a crowd sourcing system configured to respond to an inquiry by a user to a help desk according to an embodiment of the invention.

FIG. 7 shows a crowd sourcing system 700 configured to respond to an inquiry by a user 110 to a help desk according to an embodiment of the invention. The crowd sourcing system 700 comprises a platform 720 similar to the platform 620. The crowd sourcing system 700 further comprises service provider 730. In this embodiment, the platform may comprise, for example, a cloud computing resource. The crowd sourcing system 600 is coupled to and accessed by the user 110 as well as the service provider 730. The user 110 and the service provider 730 are further coupled through the user client adaptor 740 coupled to a service provider client adaptor 731 at least enabling communications between the user 110 and the service provider 730.

The service provider 730 provides agent 732 (e.g., selected mobile agent 136). Thus, the agent 732 is considered part of the service provider 730.

The user 110 contacts (e.g., via a phone, text message or email) the help desk. If the contact is via a phone call to a phone number of the help desk, the phone call will be provided to the user client adaptor 740 associated with the help desk phone number. The user client adaptor 740 answers the phone call from the user 110 (e.g., answers using an interactive voice response system). Thus, the user 110 is coupled to the user client adaptor 740 via a communications link 761 (e.g., a phone network). The user 110 may provide the inquiry to the help desk during this contact. Alternately, the user may provide the inquiry to a platform application 721 as described below.

The user client adaptor 740 searches in user profile database 770 (UP DB) for the profile of the user 110. The user profile database 770 is coupled to the user client adaptor 740. The user client adaptor 740 is further coupled to a user platform application 721. The user client adaptor 740 invokes the platform application 721 providing the profile of the user 110 as input to the platform application 721. The platform application 721 is further coupled to the user 110. The platform application 721 provides the user 110 with means for the user to provide inquiry and/or information about the inquiry to the platform 720 (e.g., the platform application 721) or to the service provider 730. For example, the platform application 721 sends the user 110 email or a text message containing an address for the user 110 to use to send the inquiry and/or information about the inquiry (e.g., a URL of an Internet or web page that may be filled out by the user 110 to provide the information) to the platform application 721.

The platform application 721 forwards the inquiry and/or information about the inquiry to a call management workflow instance 751 at a call manager service provider 750 using API(s) and relevant parameters. The call management provider 650 has one or more SIP call APIs 754. Application workflow related APIs 753 (e.g., API defining the application workflow) are provided to or coupled to the call management workflow instance 751. The platform 720 executes the workflow instance 751 to obtain information to respond to the inquiry, for example, to select the service provider 730 to respond to the inquiry (i.e., to select the service provider 730 to provide an agent 732 to respond to the inquiry), to access the selected service provider 730, and to provide the inquiry to the selected service provider 730. The workflow instance 751 may comprise, for example, accessing one or more databases 723, accessing one or more workflow accessed applications 722, and using people to perform at least a portion of the workflow instance 751. The workflow accessed applications 722 may comprise, for example, Internet or web services. The databases 723 may comprise, for example, databases associated with the workflow accessed applications 722 or databases comprising knowledge or facts relevant to answering the inquiry. Such knowledge or facts may be provided, through call related data module 752, to the service provider 730 to use in responding to the inquiry. The call management workflow instance 751 is coupled to the user application 721, the one or more workflow accessed applications 722, the one or more databases 723 and the call related data module 752. The call related data module 752 is further coupled to the service provider 730, for example, to the agent 732.

The call management workflow instance 751 is further coupled to the service provider client adaptor 731 of the selected service provider 730. The call management workflow instance 751 provides the service provider client adaptor 731 needed communications setup information (e.g., user 110 and service provider 730 phone number or numbers, service provider client phone number or numbers, text chat, URLs and/or other setup information). The setup information may be, for example, setup information for multi-channel communication.

The service provider client adaptor 731 is coupled the user client adapter 740 and to the user 110 through the user client adaptor 740. The service provider client adaptor 731 provides communication (e.g., a phone call) to user client adaptor 740 and connects the user 110 and the service provider 730 (e.g., the agent 732) using, for example, an existing enterprise VoIP communications network or other phone network (not shown).

The service provider 730 (e.g., the agent 732) responds to the communication (e.g., answers the phone call) and, optionally, access inquiry related information in or provided by the call related data module 752 and accessible using, for example, one or more URLs (e.g., one or more agent specific URLs described in step 330 of method 300).

As will be appreciated by one skilled in the art, aspects of the present invention may be embodied as a system, method or computer program product. Accordingly, aspects of the present invention may take the foam of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 7, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-7, can also include, as described herein, providing a system, wherein the system includes distinct modules (e.g., modules comprising software, hardware or software and hardware). By way of example only, the modules may include but are not limited to an agent registration module operative to perform agent registration comprising providing one or more cellular phone numbers and one or more subject areas of knowledge for each mobile agent. The registration module comprises a database storing cellular phone numbers of each mobile agent, and subject areas of knowledge for the each mobile agent. By way of further example, the modules may include but are not limited: (i) a wireless communications network accessing module configured to access a wireless communications network; and (ii) an inquiry response module operative to respond to an inquiry of a user, the responses provided by a mobile agent located outside of a fixed-location contact center, the mobile agent communicates with the user using one or more communication devices wirelessly coupled to the wireless communications network; (iii) an inquiry routing module configured to route an inquiry of a user to a mobile agent; (iv) an information obtaining module configured to obtain information by crowd sourcing for a selected agent to form a response to an inquiry of a user; and (v) a registration module operative to register each mobile agent that may be selected to respond to an inquiry of a user, the registration of each mobile agent comprising (i) storing in a database one or more cellular phone numbers of the each mobile agent, and (ii) storing in the database one or more subject areas of knowledge for the each mobile agent. By way of further example, the modules may include but are not limited to an accessing module operative to access, using at least one client adaptor, at least one agent group comprising at least one agent having knowledge regarding one or more inquiries. The at least one agent group has pre-existing communications infrastructure that is accessed by a computing platform of the contact center using the at least one client adaptor. These and other modules may be configured, for example, to perform the steps of described and illustrated in the context of FIGS. 1-7.

Figure 8:
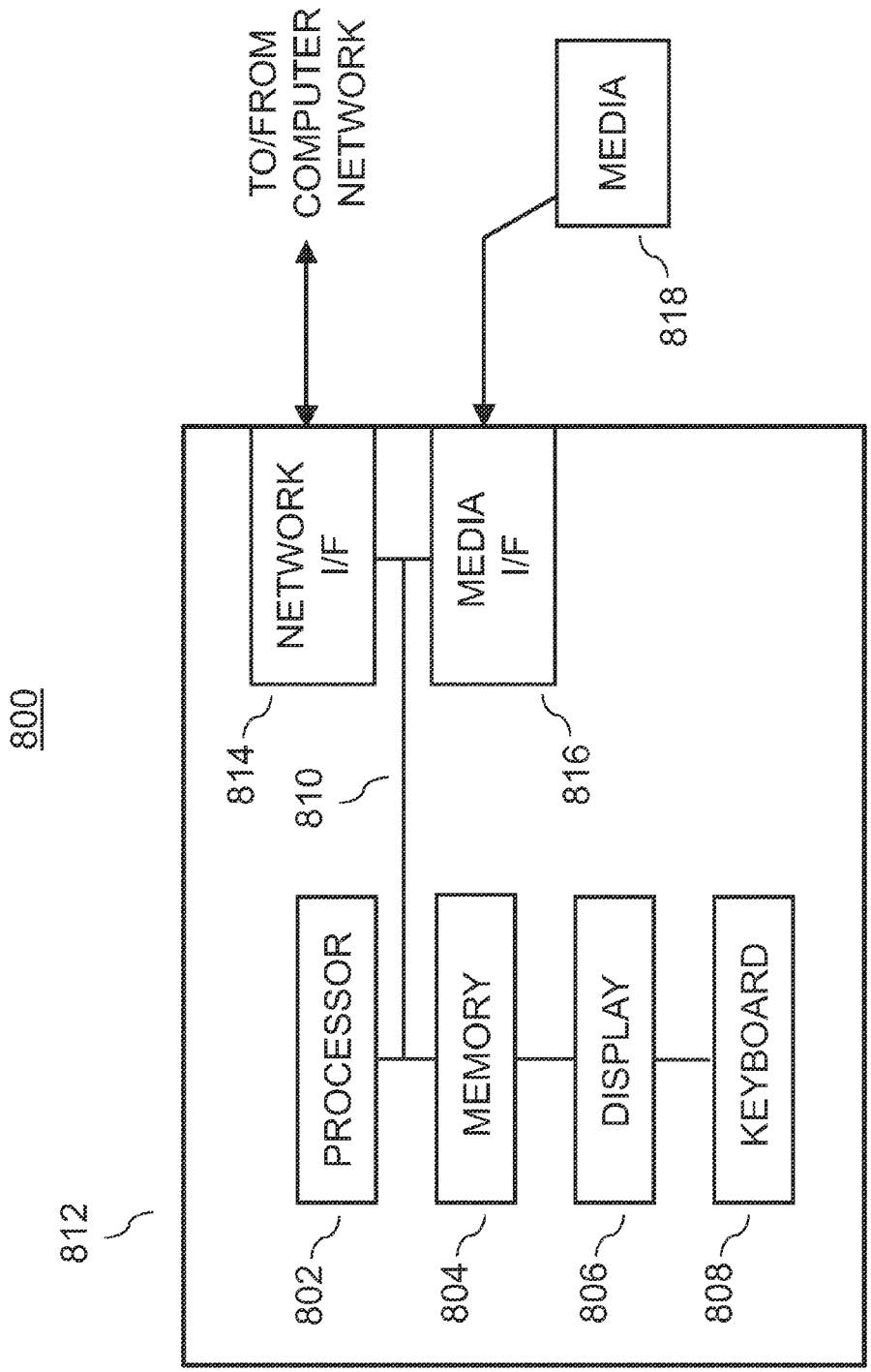
FIG. 8 depicts a computer system that may be useful in implementing one or more aspects and/or elements of the invention.

One or more embodiments can make use of software running on a general purpose computer or workstation. With reference to FIG. 8, such an implementation 800 employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 802, memory 804, and input/output interface such as display 806 and keyboard 808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for a contact center to provide information to one or more users in response to one or more inquiries from the one or more users, the method comprising:

accessing, using at least one client adaptor, at least one agent group comprising at least one agent having knowledge regarding the one or more inquiries, wherein the at least one agent group has pre-existing communications infrastructure that is accessed by a computing platform of the contact center using the at least one client adaptor; and responding, by the at least one agent and using the at least one client adaptor, to the one or more inquiries;

wherein the at least one agent group comprises a dynamic pool of a plurality of agents, at least a first one of the plurality of agents being associated with the contact center and at least a second one of the plurality of agents being associated with an entity other than the contact center.

2. The method of claim 1, wherein at least one response to the one or more inquiries is provided by at least one mobile agent of the at least one agent group, the at least one mobile agent communicates with at least one of the one or more users over communications infrastructure that is independent of a service provider providing the at least one agent group, the communications infrastructure comprising a public wireless communications network, the at least one mobile agent using one or more communication devices wirelessly coupled to the public wireless communications network.

3. The method of claim 1, wherein the at least one agent group comprises a plurality of agent groups, each of the plurality of agent groups comprising at least one of: (i) one or more mobile agents having the knowledge regarding the one or more inquiries; (ii) one or more fixed-location agents having the knowledge regarding the one or more inquiries; (iii) one or more agents employed by the contact center; (iv) one or more agents associated with an enterprise other than the contact center; and (v) one or more agents obtained by crowd sourcing.

4. The method of claim 1, wherein the at least one agent comprises a plurality of agents collaborating to respond to an inquiry of the one or more inquiries.

5. The method of claim 1, wherein the at least one client adaptor is operative for a service provider, providing the at least one agent, to respond to the one or more inquires through the computing platform without changing one or more of: (i) one or more existed dial plans of the computing platform; and (ii) one or more existing service workflows of the computing service provider.

6. The method of claim 1, wherein the at least one client adaptor is operative to specify at least one of: (i) a service workflow of a service provider; and (ii) one or more call routing parameters for the computing platform to use for the service provider, providing the at least one agent, to respond to the one or more inquires.

7. The method of claim 1, wherein the at least one client adaptor using an existing dial plan is operative to provide communications between the at least one user and the at least one agent.

8. The method of claim 1, wherein a client adaptor of the one or more users is operative for at least one of: (i) a user of the client adaptor to initially communicate with a computing platform to process the one or more inquiries; (ii) retrieving information about the user; (iii) providing further communications with the user regarding the one or more inquiries; and (iv) communicating with a client adaptor of a service provider to establish direct communications between the user and the at least one agent.

9. The method of claim 2, wherein each of the at least one mobile agent is at least one of: (i) available on an ad hoc basis; (ii) certified to have knowledge about one or more particular subjects; and (iii) compensated according to quality of service provided by the at least one mobile agent.

10. The method of claim 2, wherein the public wireless communications network comprise a cellular phone network, and wherein the one or more communication devices are at least one of: (i) one or more cellular phones; (ii) one or more computing devices; and (iii) one or more processing device coupled to one or more memory devices.

11. The method of claim 1 further comprising providing the at least one agent with information from a database of stored information related to the one or more inquiries, the information provided to the at least one agent (i) during a duration of one or more communication sessions between the one or more users and the at least one agent, and (ii) by one or more Internet pages formed, at least in part, after the one or more inquiries are received and before the one or more inquiries are routed to the at least one agent.

12. The method of claim 1 further comprising registering each of the at least one agent, the registering comprising: (i) storing in a database one or more cellular phone numbers of the each of the at least one agent; and (ii) storing in the database one or more subject areas of knowledge for the each of the at least one agent.

13. The method of claim 12, wherein a dial plan is operative to maintain and update at least the one or more cellular phone numbers in the database.

14. The method of claim 13 further comprising changing at least one of (i) the one or more cellular phone numbers stored in the database, and (ii) the dial plan, wherein the dial plan and the database are operative to be changed without affecting ongoing operations of the contact center.

15. The method of claim 1, wherein the at least one agent is accessible to a computing resource of the contact center using a computer program that interacts with a host application of the contact center.

16. The method of claim 1 further comprising routing an inquiry of the one or more inquires to a selected agent of the at least one agent, wherein the selected agent has knowledge regarding the inquiry.

17. The method of claim 16, wherein the routing of an inquiry to the selected agent is according to at least one of: (i) availability of the selected agent; (ii) a quality factor representing quality of responses from the selected agent to past inquiries; (iii) a quality factor representing quality of responses to past inquiries from a service provider providing the selected agent; (iv) geographic location of the selected agent; (v) geographic location of the service provider; and (vi) geographic location of a user of the one or more users providing the inquiry.

18. The method of claim 2, wherein the responding to the one or more inquiries comprises establishing one or more communication sessions, using the public wireless communications network, between the one or more users and the at least one mobile agent.

19. The method of claim 1 further comprising obtaining information by crowd sourcing for the at least one agent to use to form the at least one response.

20. A system for a contact center to provide information to one or more users in response to one or more inquiries from the one or more users, the system comprising:

an accessing module operative to access, using at least one client adaptor, at least one agent group comprising at least one agent having knowledge regarding the one or more inquiries, wherein the at least one agent group has pre-existing communications infrastructure that is accessed by a computing platform of the contact center using the at least one client adaptor; and an inquiry response module operative to respond, by the at least one agent and using the at least one client adaptor, to the one or more inquiries;

wherein the at least one agent group comprises a dynamic pool of a plurality of agents, at least a first one of the plurality of agents being associated with the contact center and at least a second one of the plurality of agents being associated with an entity other than the contact center.

21. The system of claim 20, wherein at least one response to the one or more inquiries is provided by at least one mobile agent of the at least one agent group, the at least one mobile agent communicates with at least one of the one or more users over communications infrastructure that is independent of a service provider providing the at least one agent group, the communications infrastructure comprising a public wireless communications network, the at least one mobile agent using one or more communication devices wirelessly coupled to the public wireless communications network.

22. The system of claim 20 further comprising an inquiry routing module operative to route an inquiry of the one or more inquires to a selected agent of the at least one agent, wherein the selected agent has knowledge regarding the inquiry.

23. The system of claim 20 further comprising a registration module configured to registering each of the at least one agent, the registering comprising: (i) storing in a database one or more cellular phone numbers of the each of the at least one agent; and (ii) storing in the database one or more subject areas of knowledge for the each of the at least one agent.

24. Apparatus for providing information to one or more users in response to one or more inquiries from the one or more users, the apparatus comprising:

a memory; and a processor coupled to the memory and configured to:

access, using at least one client adaptor, at least one agent group comprising at least one agent having knowledge regarding the one or more inquiries, wherein the at least one agent group has pre-existing communications infrastructure that is accessed by a computing platform of the contact center using the at least one client adaptor; and respond, by the at least one agent and using the at least one client adaptor, to the one or more inquiries;

wherein the at least one agent group comprises a dynamic pool of a plurality of agents, at least a first one of the plurality of agents being associated with the contact center and at least a second one of the plurality of agents being associated with an entity other than the contact center.

25. An article of manufacture for providing information to one or more users in response to one or more inquiries from the one or more users, the article of manufacture tangibly embodying a computer readable program code which, when executed, causes the computer to:

access, using at least one client adaptor, at least one agent group comprising at least one agent having knowledge regarding the one or more inquiries, wherein the at least one agent group has pre-existing communications infrastructure that is accessed by a computing platform of the contact center using the at least one client adaptor; and respond, by the at least one agent and using the at least one client adaptor, to the one or more inquiries;

wherein the at least one agent group comprises a dynamic pool of a plurality of agents, at least a first one of the plurality of agents being associated with the contact center and at least a second one of the plurality of agents being associated with an entity other than the contact center.

* * * * *